US010059832B2

(12) United States Patent
Abe et al.

(10) Patent No.: US 10,059,832 B2
(45) Date of Patent: Aug. 28, 2018

(54) POLYORGANOSILOXANE PRODUCTION METHOD

(71) Applicant: IDEMITSU KOSAN CO., LTD., Chiyoda-ku (JP)

(72) Inventors: Tomoko Abe, Ichihara (JP); Yasuhiro Ishikawa, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 31 days.

(21) Appl. No.: 14/779,429

(22) PCT Filed: Mar. 28, 2014

(86) PCT No.: PCT/JP2014/059322

§ 371 (c)(1),
(2) Date: Sep. 23, 2015

(87) PCT Pub. No.: WO2014/157681

PCT Pub. Date: Oct. 2, 2014

(65) Prior Publication Data

US 2016/0046797 A1 Feb. 18, 2016

(30) Foreign Application Priority Data

Mar. 29, 2013 (JP) ................................ 2013-075274
Jun. 12, 2013 (JP) ................................ 2013-123945

(51) Int. Cl.

| | |
|---|---|
| ***C08G 77/34*** | (2006.01) |
| ***C08K 9/12*** | (2006.01) |
| ***C08G 64/18*** | (2006.01) |
| ***C08G 77/448*** | (2006.01) |
| *C08G 77/08* | (2006.01) |
| *C08K 3/34* | (2006.01) |
| *C08K 3/36* | (2006.01) |
| *C08K 3/22* | (2006.01) |

(52) U.S. Cl.

CPC .............. *C08K 9/12* (2013.01); *C08G 64/186* (2013.01); *C08G 77/34* (2013.01); *C08G 77/448* (2013.01); *C08G 77/08* (2013.01); *C08K 3/346* (2013.01); *C08K 3/36* (2013.01); *C08K 2003/2227* (2013.01)

(58) Field of Classification Search

CPC .............................. C08G 77/34; C08G 77/448
See application file for complete search history.

(56) References Cited

U.S. PATENT DOCUMENTS

2008/0210129 A1* 9/2008 Nienstedt ............... C08G 77/34 106/287.13
2013/0211158 A1* 8/2013 Romanos ................. B01J 20/20 585/2

FOREIGN PATENT DOCUMENTS

| | | |
|---|---|---|
| DE | 41 13 292 A1 | 10/1992 |
| EP | 0 522 752 A2 | 1/1993 |
| EP | 1 104 776 A2 | 6/2001 |
| EP | 2 933 284 A1 | 10/2015 |
| JP | 8 73741 | 3/1996 |
| JP | 2662310 | 10/1997 |
| JP | 10 17670 | 1/1998 |
| JP | 11 130865 | 5/1999 |
| JP | 11 217290 | 8/1999 |
| JP | 2000 26737 | 1/2000 |
| JP | 2005 520922 | 7/2005 |
| JP | 2010 248413 | 11/2010 |
| JP | 2011 21127 | 2/2011 |
| JP | 2011 122048 | 6/2011 |
| JP | 2012 46717 | 3/2012 |
| JP | 2012 246430 | 12/2012 |

OTHER PUBLICATIONS

JP 11-130865 machine translation of original document dated 1999.*
International Search Report dated May 27, 2014 in PCT/JP2014/059322 Filed Mar. 28, 2014.
Extended European Search Report dated Sep. 19, 2016 in Patent Application No. 14772636.8.

* cited by examiner

*Primary Examiner* — Edward J Cain
(74) *Attorney, Agent, or Firm* — Oblon, McClelland, Maier & Neustadt, L.L.P.

(57) ABSTRACT

Provided is a method of producing a polyorganosiloxane, including bringing a polyorganosiloxane produced by using a transition metal-based catalyst into contact with an adsorbent having an average pore diameter of 1,000 Å or less.

6 Claims, No Drawings

POLYORGANOSILOXANE PRODUCTION METHOD

TECHNICAL FIELD

The present invention relates to a method of producing a polyorganosiloxane, and more specifically, to a method of producing a polyorganosiloxane to be used as a raw material for a polycarbonate-polyorganosiloxane copolymer.

BACKGROUND ART

A polycarbonate is excellent in mechanical properties such as transparency and impact resistance, and hence has been widely utilized in industries typified by an automobile field, an OA field, and electrical and electronic fields. Commonly, a homopolycarbonate using 2,2-bis(4-hydroxyphenyl)propane [common name: bisphenol A] as a dihydric phenol serving as a raw material has been generally used as a typical polycarbonate. A polycarbonate-polyorganosiloxane copolymer using a polyorganosiloxane as a copolymerizable monomer has been known for improving the physical properties of the homopolycarbonate such as flame retardancy and impact resistance (see Patent Documents 1 to 3).

As the polyorganosiloxane to be used as the copolymerizable monomer upon production of the polycarbonate-polyorganosiloxane copolymer, there has been used, for example, a polyorganosiloxane obtained by: causing a siloxane having a cyclic structure such as octamethylcyclotetrasiloxane and a disiloxane such as tetramethyldisiloxane to react with each other to produce a linear dimethylsiloxane; and causing a hydrogen atom at a terminal of the dimethylsiloxane to react with a phenolic compound such as 2-allylphenol or eugenol in the presence of a platinum chloride-alcoholate complex as a catalyst (see Patent Documents 4 to 6).

CITATION LIST

Patent Document

Patent Document 1: JP 2662310 B2
Patent Document 2: JP 2011-21127 A
Patent Document 3: JP 2012-246430 A
Patent Document 4: JP 2011-122048 A
Patent Document 5: JP 2012-46717 A
Patent Document 6: JP 11-217290 A

SUMMARY OF INVENTION

Technical Problem

When a polycarbonate-polyorganosiloxane copolymer is produced by an interfacial polymerization method, in a purifying step, a reaction mixture needs to be subjected to oil-water separation into an organic phase formed of an organic solvent (such as methylene chloride) containing the polycarbonate-polyorganosiloxane copolymer and an aqueous phase containing unreacted bisphenol A and an amine compound used in a polymerization catalyst. In addition, even after alkali washing, acid washing, and pure water washing for removing impurities from the separated organic phase have been performed, the organic phase and the aqueous phase need to be subjected to oil-water separation from each other.

However, the oil-water separation rate has heretofore taken time and hence has been adversely affecting the productivity of the copolymer.

Therefore, an object of the present invention is to provide a method of producing the following polyorganosiloxane. When the polyorganosiloxane is used as a raw material for a polycarbonate-polyorganosiloxane copolymer, an oil-water separation rate in the step of purifying the polycarbonate-polyorganosiloxane copolymer is high.

Solution to Problem

The inventors of the present invention have made extensive investigations, and as a result, have found that platinum used as a catalyst at the time of the production of a polyorganosiloxane remains in the polyorganosiloxane, which results in an adverse effect on separation between an organic phase and an aqueous phase upon production of a polycarbonate-polyorganosiloxane copolymer through the use of the polyorganosiloxane as a raw material by an interfacial polymerization method. The present invention has been made on the basis of such finding.

That is, the present invention relates to a method of producing a polyorganosiloxane, a polyorganosiloxane, and a polycarbonate-polyorganosiloxane copolymer according to the following items 1 to 10.

1. A method of producing a polyorganosiloxane, including bringing a polyorganosiloxane produced by using a transition metal-based catalyst into contact with an adsorbent having an average pore diameter of 1,000 Å or less.
2. The method of producing a polyorganosiloxane according to the item 1, wherein the adsorbent includes a porous adsorbent.
3. The method of producing a polyorganosiloxane according to the item 1 or 2, wherein the adsorbent includes at least one selected from the group consisting of activated clay, acid clay, activated carbon, a synthetic zeolite, a natural zeolite, activated alumina, silica, and a silica-magnesia-based adsorbent.
4. The method of producing a polyorganosiloxane according to any one of the items 1 to 3, wherein the polyorganosiloxane is represented by the following general formula (1-1):

(1-1)

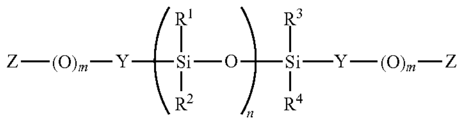

wherein $R^1$ to $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, Y represents a single bond, or an organic residue containing an aliphatic or aromatic moiety, the organic residue being bonded to Si and O or to Si and Z, n represents an average number of repetitions, m represents 0 or 1, Z each independently represent a halogen, $—R^5OH$, $—R^5COOH$, $—R^5NH_2$, $—R^5NHR^6$, —COOH, or —SH, $R^5$ represents a linear, branched, or cyclic alkylene group, an aryl-substituted alkylene group, an aryl-substituted alkylene group that may have an alkoxy group on a ring thereof, or an arylene group, and $R^6$ represents an alkyl group, an alkenyl group, an aryl group, or an aralkyl group.

5. The method of producing a polyorganosiloxane according to the item 4, wherein $R^1$ to $R^4$ each independently represent a hydrogen atom, an alkyl group having 1 to 6 carbon atoms, an alkoxy group having 1 to 6 carbon atoms, or an aryl group having 6 to 12 carbon atoms, and Z each independently represent —$R^5$OH, —$R^5$COOH, —$R^5NH_2$, —$R^5NHR^6$, —COOH, or —SH.

6. The method of producing a polyorganosiloxane according to any one of the items 1 to 5, wherein the polyorganosiloxane is represented by the following general formula (1-2) or (1-4):

(1-2)

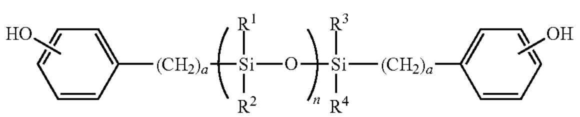

(1-4)

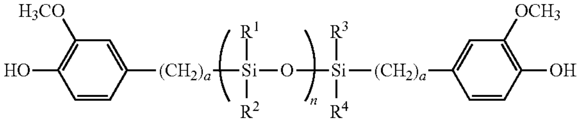

wherein $R^1$ to $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, n represents an average number of repetitions, and a represents a positive integer.

7. The method of producing a polyorganosiloxane according to any one of the items 4 to 6, wherein $R^1$ to $R^4$ each represent a methyl group.

8. A polyorganosiloxane produced by the method of any one of the items 1 to 7, the polyorganosiloxane having a platinum content of 1 ppm by mass or less.

9. A polycarbonate-polyorganosiloxane copolymer produced by using the polyorganosiloxane of the item 8.

10. The polycarbonate-polyorganosiloxane copolymer according to the item 9, wherein the polycarbonate-polyorganosiloxane copolymer includes a polyorganosiloxane moiety as a repeating unit having a structure represented by the following general formula (I) and a polycarbonate moiety as a repeating unit having a structure represented by the following general formula (II):

(I)

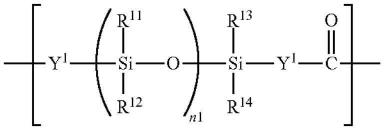

(II)

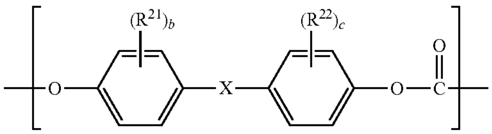

wherein $R^{11}$ to $R^{14}$ each independently represent a hydrogen atom, a halogen atom, an alkyl group having 1 to 6 carbon atoms, an alkoxy group having 1 to 6 carbon atoms, or an aryl group having 6 to 12 carbon atoms, $Y^1$ represents a single bond, or an organic residue containing an aliphatic or aromatic moiety, n1 represents an average number of repetitions, $R^{21}$ and $R^{22}$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —$SO_2$—, —O—, or —CO—, and b and c each independently represent an integer of 0 to 4.

Advantageous Effects of Invention

According to the method of the present invention, a polyorganosiloxane whose transition metal content, especially platinum content is small can be efficiently produced. When the polyorganosiloxane obtained by the present invention is used, an oil-water separation rate in the step of purifying a polycarbonate-polyorganosiloxane copolymer is high, and hence the polycarbonate-polyorganosiloxane copolymer can be efficiently produced.

DESCRIPTION OF EMBODIMENTS

A method of producing a polyorganosiloxane of the present invention includes bringing a polyorganosiloxane produced by using a transition metal-based catalyst (hereinafter sometimes referred to as "crude polyorganosiloxane") into contact with an adsorbent having an average pore diameter of 1,000 Å or less.

<Polyorganosiloxane>

In the present invention, the polyorganosiloxane preferably has a repeating unit represented by the following general formula (1).

(1)

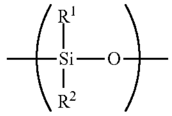

wherein, $R^1$ and $R^2$ each independently represent a hydrogen atom, a halogen atom, an alkyl group having 1 to 6 carbon atoms, an alkoxy group having 1 to 6 carbon atoms, or an aryl group having 6 to 12 carbon atoms.

Examples of the halogen atom represented by $R^1$ or $R^2$ include a fluorine atom, a chlorine atom, a bromine atom, and an iodine atom. Examples of the alkyl group represented by $R^1$ or $R^2$ include a methyl group, an ethyl group, a n-propyl group, an isopropyl group, various butyl groups ("various" means that a linear group and any branched group are included, and the same applies hereinafter), various pentyl groups, and various hexyl groups. An example of the alkoxy group represented by $R^1$ or $R^2$ is an alkoxy group whose alkyl group moiety is the alkyl group described above. Examples of the aryl group represented by $R^1$ or $R^2$ include a phenyl group and a naphthyl group.

It should be noted that $R^1$ and $R^2$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group.

The polyorganosiloxane is preferably represented by the following general formula (1-1).

(1-1)

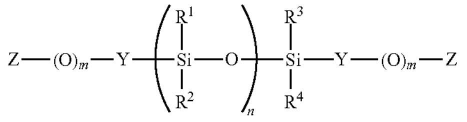

wherein $R^1$ to $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, Y represents a single bond, or an organic residue containing an aliphatic or aromatic moiety, the organic residue being bonded to Si and O or to Si and Z, n represents an average number of repetitions, m represents 0 or 1, Z each independently represent a halogen, $—R^5OH$, $—R^5COOH$, $—R^5NH_2$, $—R^5NHR^6$, —COOH, or —SH, $R^5$ represents a linear, branched, or cyclic alkylene group, an aryl-substituted alkylene group, an aryl-substituted alkylene group that may have an alkoxy group on a ring thereof, or an arylene group, and $R^6$ represents an alkyl group, an alkenyl group, an aryl group, or an aralkyl group.

$R^1$ and $R^2$ are as described above, and $R^3$ and $R^4$ are the same as $R^1$ and $R^2$. $R^1$ to $R^4$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group.

Y represents a single bond, or an organic residue containing an aliphatic or aromatic moiety, the organic residue being bonded to Si and O or to Si and Z.

n represents an average number of repetitions and is preferably 10 to 1,000. It should be noted that a value for the average number of repetitions n is a value calculated by nuclear magnetic resonance (NMR) measurement.

Z preferably represents $—R^5OH$, $—R^5COOH$, $—R^5NH_2$, $—R^5NHR^6$, —COOH, or —SH. As in the foregoing, the $R^5$ represents a linear, branched, or cyclic alkylene group, an aryl-substituted alkylene group, an aryl-substituted alkylene group that may have an alkoxy group on a ring thereof, or an arylene group, and $R^6$ represents an alkyl group, an alkenyl group, an aryl group, or an aralkyl group. Z preferably represents a residue of a phenol-based compound having an alkyl group, and more preferably represents an organic residue derived from allylphenol or an organic residue derived from eugenol.

Examples of the polyorganosiloxane represented by the general formula (1-1) include compounds represented by the following general formulae (1-2) to (1-12).

(1-2)

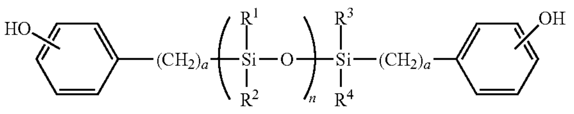

(1-3)

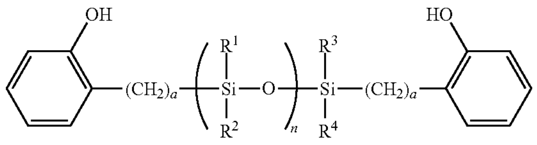

(1-4)

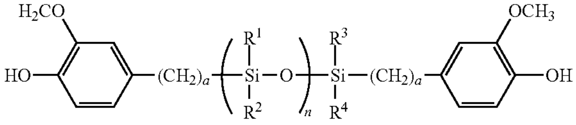

(1-5)

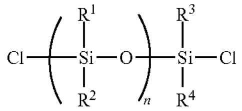

(1-6)

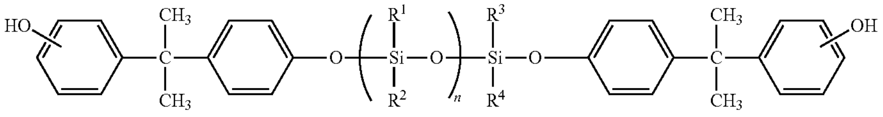

(1-7)

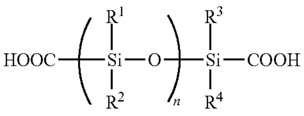

(1-8)

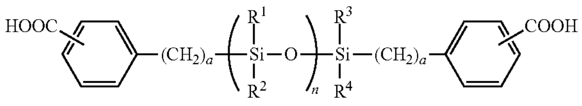

(1-9)

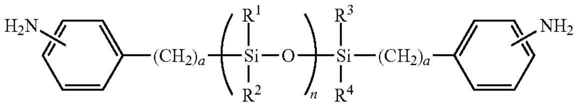

(1-10)

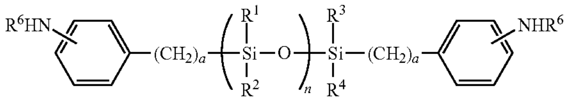

(1-11)

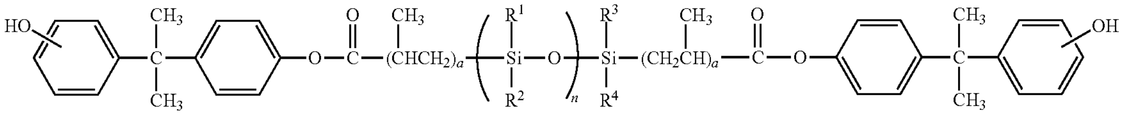

-continued (1-12)

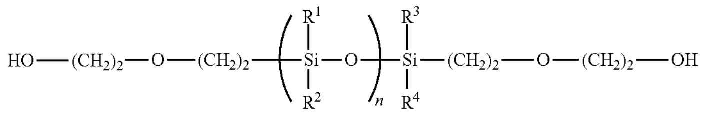

In the general formulae (1-2) to (1-12), $R^1$ to $R^4$, $R^6$, and n are as described above, and preferred ones thereof are also the same as those described above. In addition, a represents a positive integer and typically represents an integer of 1 to 6.

Among them, a phenol-modified polyorganosiloxane represented by the general formula (1-2) is preferred from the viewpoint of the ease of polymerization upon production of a polycarbonate-polyorganosiloxane copolymer. From the viewpoint of the ease of availability, α,ω-bis[3-(o-hydroxyphenyl)propyl]polydimethylsiloxane as one kind of the compounds each represented by the general formula (1-3) or α,ω-bis[3-(4-hydroxy-3-methoxyphenyl)propyl]polydimethylsiloxane as one kind of the compounds each represented by the general formula (1-4) is preferred.

A method of producing the crude polyorganosiloxane to be used in the present invention is not particularly limited. According to, for example, a method described in JP 11-217390 A, the crude polyorganosiloxane can be obtained by: causing cyclotrisiloxane and disiloxane to react with each other in the presence of an acid catalyst to synthesize α,ω-dihydrogen organopentasiloxane; and then subjecting the α,ω-dihydrogen organopentasiloxane to an addition reaction with a phenolic compound (such as 2-allylphenol, 4-allylphenol, eugenol, or 2-propenylphenol) or the like in the presence of a catalyst for a hydrosilylation reaction. According to a method described in JP 2662310 B2, the crude polyorganosiloxane can be obtained by: causing octamethylcyclotetrasiloxane and tetramethyldisiloxane to react with each other in the presence of sulfuric acid (acid catalyst); and subjecting the resultant α,ω-dihydrogen organopolysiloxane to an addition reaction with a phenolic compound in the presence of the catalyst for a hydrosilylation reaction in the same manner as in the foregoing. It should be noted that the chain length n of the α,ω-dihydrogen organopolysiloxane can be appropriately adjusted depending on a polymerization condition therefor before its use, or a commercially available α,ω-dihydrogen organopolysiloxane may be used.

Examples of the catalyst for a hydrosilylation reaction include transition metal-based catalysts. Among them, a platinum-based catalyst is preferably used in terms of a reaction rate and selectivity. Specific examples of the platinum-based catalyst include chloroplatinic acid, a solution of chloroplatinic acid in an alcohol, an olefin complex of platinum, a complex of platinum and a vinyl group-containing siloxane, platinum-supported silica, and platinum-supported activated carbon.

<Adsorbent>

In the method of the present invention, the adsorbent is caused to adsorb and remove a transition metal derived from the transition metal-based catalyst used as the catalyst for a hydrosilylation reaction in the crude polyorganosiloxane by bringing the crude polyorganosiloxane into contact with the adsorbent.

The adsorbent to be used in the present invention has an average pore diameter of 1,000 Å or less. When the average pore diameter is 1,000 Å or less, the transition metal in the crude polyorganosiloxane can be efficiently removed. From such viewpoint, the average pore diameter of the adsorbent is preferably 500 Å or less, more preferably 200 Δ or less, still more preferably 150 Å or less, still furthermore preferably 100 Å or less. In addition, from the same viewpoint, the adsorbent is preferably a porous adsorbent.

It should be noted that the average pore diameter of the adsorbent is measured with an automatic gas adsorption measuring device, and is specifically measured by a method described in Examples.

The adsorbent is not particularly limited as long as the adsorbent has the above-mentioned average pore diameter. For example, there may be used activated clay, acid clay, activated carbon, a synthetic zeolite, a natural zeolite, activated alumina, silica, a silica-magnesia-based adsorbent, diatomaceous earth, and cellulose. The adsorbent is preferably at least one selected from the group consisting of activated clay, acid clay, activated carbon, a synthetic zeolite, a natural zeolite, activated alumina, silica, and a silica-magnesia-based adsorbent.

After the adsorbent has been caused to adsorb the transition metal in the crude polyorganosiloxane, the adsorbent can be separated from the polyorganosiloxane by arbitrary separating means. Examples of the means for separating the adsorbent from the polyorganosiloxane include a filter and centrifugation. When the filter is used, a filter such as a membrane filter, a sintered metal filter, or a glass fiber filter can be used. Among them, the membrane filter is particularly preferably used.

The average particle diameter of the adsorbent is typically 1 μm to 4 mm, preferably 1 μm to 100 μm from the viewpoint of separating the adsorbent from the polyorganosiloxane after the adsorption of the transition metal.

In the present invention, the amount of the adsorbent used is not particularly limited. However, the amount of the porous adsorbent used falls within the range of preferably 1 part by mass to 30 parts by mass, more preferably 2 parts by mass to 20 parts by mass with respect to 100 parts by mass of the crude polyorganosiloxane.

It should be noted that when the crude polyorganosiloxane to be treated has so high a molecular weight and the crude polyorganosiloxane is not in a liquid state, the polyorganosiloxane may be heated to such a temperature as to be in a liquid state upon performance of the adsorption with the adsorbent and the separation of the adsorbent. Alternatively, the polyorganosiloxane is dissolved in a solvent such as methylene chloride or hexane, and then the adsorption and the separation may be performed.

A polyorganosiloxane produced by the method of the present invention has a transition metal content, especially a platinum content of 1 ppm by mass or less, preferably 0.5 ppm by mass or less, more preferably 0.2 ppm by mass or less. When the platinum content in the polyorganosiloxane is 1 ppm by mass or less, an oil-water separation rate in the step of purifying a polycarbonate-polyorganosiloxane copolymer upon production of the polycarbonate-polyorganosiloxane copolymer through the use of the polyorganosiloxane can be increased. In addition, when the platinum content in the polyorganosiloxane is 1 ppm by mass or less, the hue of the polyorganosiloxane improves. Here, a situation where the hue of the polyorganosiloxane improves is assumed to mean that the oxidative deterioration of the polyorganosiloxane has been reduced. In other words, a situation where the hue of the polyorganosiloxane is bad is assumed to mean that the oxidative deterioration of the polyorganosiloxane is progressing. In view of the above, for example, when a composition is produced by using the polyorganosiloxane produced by the method of the present invention as an additive (such as a release agent) and a molded article is produced from the composition, an improving effect on the hue of the molded article is expected. In other words, in the case where the polyorganosiloxane of the present invention is used, the hue of the molded article is expected to improve as compared to the case where a polyorganosiloxane having a bad hue is used as an additive.

The transition metal content, especially the platinum content in the polyorganosiloxane in the present invention is measured with an ICP emission analyzer and is specifically measured by a method described in Examples.

<Polycarbonate-Polyorganosiloxane Copolymer>

The polyorganosiloxane produced by the method of the present invention can be suitably used in the production of a polycarbonate-polyorganosiloxane copolymer (hereinafter sometimes abbreviated as "PC-POS copolymer"). A known production method such as an interfacial polymerization method (phosgene method), a pyridine method, or an ester exchange method can be employed as a method of producing the PC-POS copolymer. Particularly in the case of the interfacial polymerization method, the step of separating an organic phase containing the PC-POS copolymer and an aqueous phase containing an unreacted substance, a catalyst residue, or the like becomes easy, and hence the separation of the organic phase containing the PC-POS copolymer and the aqueous phase in each washing step based on alkali washing, acid washing, or pure water washing becomes easy. Accordingly, the PC-POS copolymer is efficiently obtained.

In addition, the PC-POS copolymer obtained by using the polyorganosiloxane of the present invention is of high quality because the copolymer has a small amount of a catalyst residue derived from the platinum-based catalyst in the copolymer. The PC-POS copolymer of the present invention has a platinum content of 0.4 ppm by mass or less, preferably 0.2 ppm by mass or less, more preferably 0.08 ppm by mass or less, still more preferably 0.06 ppm by mass or less. It should be noted that the platinum content in the PC-POS copolymer is measured with an ICP emission analyzer as in the measurement of the platinum content in the polyorganosiloxane.

The PC-POS copolymer of the present invention preferably includes a polyorganosiloxane moiety as a repeating unit having a structure represented by the following general formula (I) and a polycarbonate moiety as a repeating unit having a structure represented by the following general formula (II).

(I)

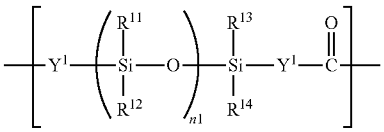

-continued (II)

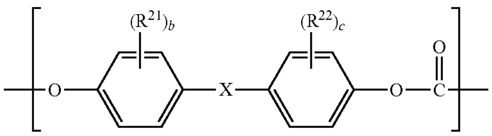

wherein $R^{11}$ to $R^{14}$ each independently represent a hydrogen atom, a halogen atom, an alkyl group having 1 to 6 carbon atoms, an alkoxy group having 1 to 6 carbon atoms, or an aryl group having 6 to 12 carbon atoms, $Y^1$ represents a single bond, or an organic residue containing an aliphatic or aromatic moiety, n1 represents an average number of repetitions, $R^{21}$ and $R^{22}$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —$SO_2$—, —O—, or —CO—, and b and c each independently represent an integer of 0 to 4.

In the general formula (I), $R^{11}$ to $R^{14}$, $Y^1$, and n1 are the same as $R^1$ to $R^4$, Y, and n in the general formula (1-1), and preferred ones thereof are also the same as those in the above.

A method of producing the PC-POS copolymer is not particularly limited and the copolymer can be produced with reference to a known method of producing a PC-POS copolymer such as a method described in JP 2010-241943 A.

Specifically, the PC-POS copolymer can be produced by: dissolving an aromatic polycarbonate oligomer produced in advance and the polyorganosiloxane of the present invention in a water-insoluble organic solvent (such as methylene chloride); adding an aqueous solution of a dihydric phenol-based compound (such as bisphenol A) in an alkaline compound (such as aqueous sodium hydroxide) to the solution; and subjecting the mixture to an interfacial polycondensation reaction through the use of a tertiary amine (such as triethylamine) or a quaternary ammonium salt (such as trimethylbenzylammonium chloride) as a polymerization catalyst in the presence of a terminal stopper (a monohydric phenol such as p-t-butylphenol). In addition, the PC-POS copolymer can be produced by copolymerizing a polyorganosiloxane, a dihydric phenol, and phosgene, a carbonate, or a chloroformate.

The polyorganosiloxane represented by the general formula (1-1) is preferably used as the polyorganosiloxane. It should be noted that the content of the repeating unit containing a structure represented by the general formula (I) can be adjusted by, for example, adjusting the usage amount of the polyorganosiloxane represented by the general formula (1-1).

The polycarbonate oligomer can be produced through a reaction of a dihydric phenol and a carbonate precursor such as phosgene in an organic solvent such as methylene chloride, chlorobenzene, or chloroform. When the polycarbonate oligomer is produced by using a transesterification method, the oligomer can also be produced through a reaction of a dihydric phenol and a carbonate precursor such as diphenyl carbonate.

A dihydric phenol represented by the following general formula (2) is preferably used as the dihydric phenol.

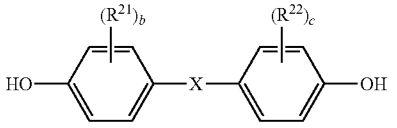

(2)

In the formula, $R_{21}$, $R_{22}$, X, b, and c are as described above.

Examples of the dihydric phenol represented by the general formula (2) include bis(hydroxyphenyl)alkane dihydric phenols such as 2,2-bis(4-hydroxyphenyl)propane [bisphenol A], bis(4-hydroxyphenyl)methane, 1,1-bis(4-hydroxyphenyl)ethane, and 2,2-bis(4-hydroxy-3,5-dimethylphenyl)propane, 4,4'-dihydroxydiphenyl, a bis(4-hydroxyphenyl)cycloalkane, bis(4-hydroxyphenyl) oxide, bis(4-hydroxyphenyl) sulfide, bis(4-hydroxyphenyl) sulfone, bis(4-hydroxyphenyl) sulfoxide, and bis(4-hydroxyphenyl) ketone.

Among them, bis(hydroxyphenyl)alkane-based dihydric phenols are preferred, and bisphenol A is more preferred.

the dihydroxydiaryl sulfone include 4,4'-dihydroxydiphenyl sulfone and 4,4'-dihydroxy-3,3'-dimethyldiphenyl sulfone.

An example of the dihydroxydiphenyl is 4,4'-dihydroxydiphenyl. Examples of the dihydroxydiarylfluorene include 9,9-bis(4-hydroxyphenyl)fluorene and 9,9-bis(4-hydroxy-3-methylphenyl) fluorene. Examples of the dihydroxydiaryladamantane include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of the dihydric phenol other than the above-mentioned dihydric phenol include 4,4'-[1,3-phenylenebis(1-methylethylidene)]bisphenol, 10,10-bis(4-hydroxyphenyl)-9-anthrone, and 1,5-bis(4-hydroxyphenylthio)-2,3-dioxapentane.

Further, the PC-POS copolymer can be produced by copolymerizing the dihydric phenol represented by the general formula (2), a polyorganosiloxane represented by the following general formula (3), and phosgene, a carbonate ester, or a chloroformate. Here, the polyorganosiloxane represented by the following general formula (3) is a product of a reaction between the polyorganosiloxane represented by the general formula (1-1) and a diisocyanate compound.

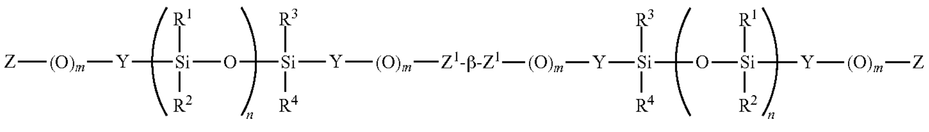

(3)

When bisphenol A is used as the dihydric phenol, the PC-POS copolymer in which X represents an isopropylidene group and a relationship of b=c=0 is satisfied in the general formula (II) is obtained.

Examples of the dihydric phenol other than bisphenol A include a bis(hydroxyaryl)alkane, a bis(hydroxyaryl)cycloalkane, a dihydroxyaryl ether, a dihydroxydiaryl sulfide, a dihydroxydiaryl sulfoxide, a dihydroxydiaryl sulfone, a dihydroxydiphenyl, a dihydroxydiarylfluorene, and a dihydroxydiaryladamantane. One of those dihydric phenols may be used alone, or two or more thereof may be used as a mixture.

Examples of the bis(hydroxyaryl)alkane include bis(4-hydroxyphenyl)methane, 1,1-bis(4-hydroxyphenyl)ethane, 2,2-bis(4-hydroxyphenyl)butane, 2,2-bis(4-hydroxyphenyl) octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl) propane, 2,2-bis(4-hydroxy-3,5-dichlorophenyl)propane, and 2,2-bis(4-hydroxy-3,5-dibromophenyl)propane.

Examples of the bis(hydroxyaryl)cycloalkane include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane. Examples of the dihydroxyaryl ether include 4,4'-dihydroxyphenyl ether and 4,4'-dihydroxy-3,3'-dimethylphenyl ether.

Examples of the dihydroxydiaryl sulfide include 4,4'-dihydroxydiphenyl sulfide and 4,4'-dihydroxy-3,3'-dimethyldiphenyl sulfide. Examples of the dihydroxydiaryl sulfoxide include 4,4'-dihydroxydiphenyl sulfoxide and 4,4'-dihydroxy-3,3'-dimethyldiphenyl sulfoxide. Examples of In the general formula (3), $R^1$ to $R^4$, n, m, Y, and Z are as defined in the above, and preferred ones thereof are also the same as those in the above.

$Z^1$ represents a divalent group derived from Z in the polyorganosiloxane represented by the general formula (1-1) after the reaction of the Z with a —NCO group of the diisocyanate compound.

β represents a divalent group derived from the diisocyanate compound, or a divalent group derived from a dicarboxylic acid or a halide of the dicarboxylic acid, and examples thereof include divalent groups each represented by anyone of the following general formulae (3-1) to (3-5).

(3-1)

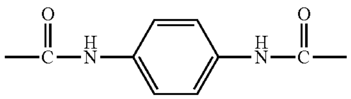

(3-2)

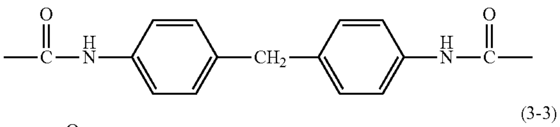

(3-3)

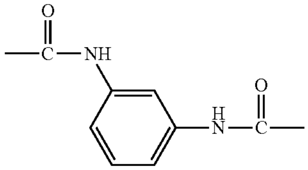

(3-4)

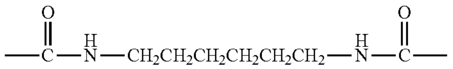

-continued (3-5)

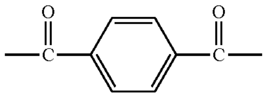

In order to control the molecular weight of the PC-POS copolymer to be obtained, a terminal stopper can be used. Examples of the terminal stopper may include monohydric phenols such as phenol, p-cresol, p-tert-butylphenol, p-tert-octylphenol, p-cumylphenol, p-nonylphenol, and p-tert-amylphenol. One of those monohydric phenols may be used alone, or two or more thereof may be used in combination.

In the PC-POS copolymer of the present invention, n (a degree of polymerization) representing the chain length of the polyorganosiloxane represented by the general formula (1-1) is typically about 10 to 1,000, and is preferably 30 to 600, more preferably 40 to 300, still more preferably 40 to 200 from the viewpoints of an improvement in impact strength of the copolymer, workability, and an excellent flame retardancy. When n is 10 or more, an improving effect on the impact strength becomes sufficient, and when n is 1,000 or less, handleability upon production of the PC-POS copolymer becomes satisfactory, which eliminates such a risk that the workability is impaired.

The PC-POS copolymer of the present invention can be produced by appropriately using, for example, a molecular weight modifier so that its viscosity-average molecular weight may be a molecular weight intended for an application or product in which the copolymer is used. The copolymer is produced so as to have a viscosity-average molecular weight in the range of typically about 14,000 to 23,000, preferably about 15,000 to 22,000. When the viscosity-average molecular weight is 14,000 or more, the rigidity and impact strength of a molded body obtained by molding the copolymer become sufficient, and when the molecular weight is 23,000 or less, the viscosity of the PC-POS copolymer does not become excessively large and hence the productivity upon its production becomes satisfactory. In addition, there is no risk in that it becomes difficult to mold the copolymer into a thin body.

It should be noted that the viscosity-average molecular weight (Mv) is a value calculated from Schnell's equation ($[\eta]=1.23\times10^{-5}\times Mv^{0.83}$) by measuring the limiting viscosity $[\eta]$ of a methylene chloride solution at 20° C.

After the interfacial polycondensation reaction, the resultant is appropriately left at rest to be separated into an aqueous phase and a water-insoluble organic solvent phase [separating step], the water-insoluble organic solvent phase is washed (preferably washed with a basic aqueous solution, an acidic aqueous solution, and water in the stated order) [washing step], and the resultant organic phase is concentrated [concentrating step], pulverized [pulverizing step], and dried [drying step]. Thus, the PC-POS copolymer can be obtained. According to the present invention, oil-water separation rates in the separating step and the washing step are high, and hence the PC-POS copolymer can be efficiently produced.

EXAMPLES

The present invention is more specifically described by way of Examples. However, the present invention is by no means limited by these Examples.

It should be noted that in each of Examples, characteristic values and evaluation results were determined in the following manner.

(1) Average Pore Diameter of Adsorbent

A filtering medium adsorbent was subjected to a vacuum evacuation treatment at 200° C. for 3 hours, and its average pore diameter was measured with a pore size analyzer ("AUTOSORB-3" manufactured by Quantachrome Instruments) by a constant volume method (nitrogen adsorption).

(2) Platinum Content

A platinum content in a sample was measured with an ICP emission analyzer (manufactured by Hitachi High-Tech Science Corporation, trade name: "SPS5100") under the measurement conditions of a calibration curve method.

(3) Platinum Removal Ratio

The removal ratio of platinum from a PDMS was calculated by the following method.

Removal ratio (%)={1−[platinum content (ppm by mass) in PDMS after purification]/[platinum content (ppm by mass) in PDMS before purification]}×100

In particular, the platinum content in the PDMS after the purification represents the platinum content in the PDMS after the purification of a crude polyorganosiloxane with an adsorbent in each of Examples 1 to 6, and represents the platinum content in the PDMS after the purification of the crude polyorganosiloxane with a filter made of polypropylene in Comparative Example 2. The platinum content in the PDMS before the purification represents the platinum content in the PDMS measured in Comparative Example 1.

(4) Hue Evaluation (APHA)

A hue was visually evaluated by using an APHA standard color.

(5) Viscosity-average Molecular Weight of Polycarbonate-polyorganosiloxane Copolymer A viscosity-average molecular weight (Mv) was calculated from the following equation by using a limiting viscosity $[\eta]$ determined through the measurement of the viscosity of a methylene chloride solution at 20° C. with an Ubbelohde-type viscometer.

$$[\eta]=1.23\times10^{-5}Mv^{0.83}$$

(6) Water Content in Organic Phase after Oil-Water Separation

A water content in an organic phase after oil-water separation was measured by titrating water using a water vaporizer ("Model VA-100" manufactured by Mitsubishi Chemical Corporation) and a trace water-measuring apparatus ("Model CA-100" manufactured by Mitsubishi Chemical Corporation) according to Karl Fischer titration. The measurement was performed under the following measurement conditions: the flow rate of a nitrogen gas in the water vaporizer was 250 ml/min and the temperature of the heating furnace of the water vaporizer was 230° C.

Example 1

(1) Production of Crude Polyorganosiloxane 594 g (2 mol) of octamethylcyclotetrasiloxane, 30.0 g (0.2 mol) of 1,1,3,3-tetramethyldisiloxane, and 35 g of 86 mass % sulfuric acid were mixed, and the mixture was stirred at room temperature for 17 hours. An oil phase was separated from the mixture, 25 g of sodium hydrogen carbonate was added to the phase, and the resultant mixture was stirred for 1 hour to be neutralized. After the neutralized product had been filtered, volatile matter mainly formed of a lowmolecular weight polyorganosiloxane was removed by distilling the filtrate at 150° C. in a vacuum of 400 Pa.

309 g of the oil obtained in the above was added at 90° C. to a solution prepared by dissolving 148 g (1.1 mol) of 2-allylphenol and 0.0044 g of chloroplatinic acid hexahydrate in 1 mL of an isopropyl alcohol solution. The mixture was stirred for 3 hours while its temperature was kept at 90° C. to 115° C.

The product thus obtained was dissolved in 10 L of methylene chloride. After that, the solution was washed with 1.5 L of 0.3 mol/L aqueous NaOH twice, washed with 1.5 L of 2 mass % phosphoric acid for neutralization, and further washed with water once. Methylene chloride was removed by concentration at 30° C. to 40° C. under reduced pressure, and methylene chloride was further removed under reduced pressure at 60° C. Thus, a 2-allylphenol terminal-modified PDMS (crude PDMS) was obtained.

The structure and composition of the resultant crude PDMS were analyzed by $^1$H-NMR. As a result, the number of repetitions of the dimethylsiloxy unit of the resultant 2-allylphenol terminal-modified PDMS was 40. In addition, a platinum content in the crude PDMS was 2.0 ppm by mass.

(2) Purification of Polyorganosiloxane (Production of PDMS-1)

20 g of methylene chloride and 20 g of the 2-allylphenol terminal-modified PDMS obtained in the above were loaded into a 100-mL glass vessel, and the 2-allylphenol terminal-modified PDMS was dissolved in methylene chloride. Next, 1 g of activated clay (manufactured by Mizusawa Industrial Chemicals, Ltd., trade name: “GALLEON EARTH V2”, average pore diameter: 63 Å) was added as an adsorbent to the solution, and the mixture was stirred at 17° C. for 3 hours. The activated clay used as the adsorbent was suction-filtered with a membrane filter (manufactured by ADVANTEC, filter paper made of polytetrafluoroethylene, pore diameter: 0.2 μm). Thus, a filtrate was obtained. Methylene chloride was removed by concentrating the filtrate, and then the residue was dried under vacuum to provide a 2-allylphenol terminal-modified PDMS (PDMS-1). A platinum content in the 2-allylphenol terminal-modified PDMS was 0.1 ppm by mass. A platinum removal ratio by the purification was 95 mass %. The APHA of the purified polyorganosiloxane was 25. The results are shown in Table 1.

Examples 2 to 6

Polyorganosiloxanes (PDMS-2 to PDMS-6) were each produced by using the crude PDMS produced in the section (1) of Example 1 (platinum content: 2.0 ppm by mass) in the same manner as in Example 1 except that an adsorbent shown in Table 1 was used as an adsorbent instead of the activated clay, and the polyorganosiloxanes were subjected to similar measurements. The results are shown in Table 1.

It should be noted that the adsorbents used in Examples are as described below.

Acid clay (manufactured by Mizusawa Industrial Chemicals, Ltd., trade name: “MIZUKA ACE #20”, average pore diameter: 108 Å)

Activated carbon (manufactured by Wako Pure Chemical Industries, Ltd., average pore diameter: 40 Å)

Silica-magnesia (manufactured by Mizusawa Industrial Chemicals, Ltd., trade name: “MIZUKALIFE P-1”, average pore diameter: 70 Å)

Synthetic zeolite (manufactured by Mizusawa Industrial Chemicals, Ltd., trade name: “MIZUKASIEVES EX-122”, average pore diameter: 19 Å)

Activated alumina (manufactured by Mizusawa Industrial Chemicals, Ltd., trade name: “ACTIVATED ALUMINA GP-20”, average pore diameter: 111 Å)

Comparative Example 1

A polyorganosiloxane (PDMS-7) was produced by using the crude PDMS produced in the section (1) of Example 1 (platinum content: 2.0 ppm by mass) in the same manner as in Example 1 except that no adsorbent was used, and the polyorganosiloxane was subjected to similar measurements. The results are shown in Table 1.

Comparative Example 2

A tubular filter made of polypropylene having an inner diameter of 8.5 cm and a length of 12.5 cm (“Model BFP-410-1” manufactured by Taki Engineering Co., Ltd.) was set in a cylindrical glass vessel having an inner diameter of 10 cm and a height of 18 cm. 20 g of the crude PDMS produced in the section (1) of Example 1 (platinum content: 2.0 ppm by mass) was flowed into the filter to provide a filtrate as a polyorganosiloxane (PDMS-8). After that, similar measurements were performed. The results are shown in Table 1.

TABLE 1

| | Example | | | | | | Comparative Example | |
|---|---|---|---|---|---|---|---|---|
| | 1 | 2 | 3 | 4 | 5 | 6 | 1 | 2 |
| PDMS | PDMS-1 | PDMS-2 | PDMS-3 | PDMS-4 | PDMS-5 | PDMS-6 | PDMS-7 | PDMS-8 |
| Chain length (*1) | 40 | 40 | 40 | 40 | 40 | 40 | 40 | 40 |
| Adsorbent | Activated clay | Acid clay | Activated carbon | Silica-magnesia | Synthetic zeolite | Activated alumina | None | None (*2) |
| Average pore diameter of adsorbent (Å) | 63 | 108 | 40 | 70 | 19 | 111 | — | — (*2) |
| Pt content (ppm by mass) | 0.1 | 0.1 | 0.1 | 0.1 | 0.2 | 0.3 | 2.0 | 2.0 |
| Pt removal ratio (mass %) | 95 | 95 | 95 | 95 | 90 | 85 | 0 | 0 |
| APHA of PDMS | 25 | 25 | 25 | 25 | 60 | 60 | 300 | 300 |

*1: The number of repetitions of a dimethylsiloxy unit in a PDMS

*2: A tubular filter made of polypropylene (having an average pore diameter of 10,000 Å) was used.

The polyorganosiloxane (PDMS-7) of Comparative Example 1 which did not be treated with any adsorbent was poor in hue. In Comparative Example 2 where the filter made of polypropylene having an average pore diameter of 10,000 Å was used, platinum could not be removed and the resultant polyorganosiloxane (PDMS-8) was poor in hue as in Comparative Example 1.

In contrast, in Examples 1 to 6 where the adsorbents each having an average pore diameter of 1,000 Å or less were used, platinum was able to be effectively removed, and the resultant polyorganosiloxanes (PDMS-1 to PDMS-6) each had a platinum content of 1 ppm by mass or less and a satisfactory hue.

Production Example 1

<Production of Polycarbonate Oligomer>

To 5.6 mass aqueous sodium hydroxide, 2,000 ppm by mass % of sodium dithionite with respect to bisphenol A (hereinafter referred to as "BPA") to be dissolved later was added. BPA was dissolved in the solution so that the concentration of BPA became 13.5 mass %. Thus, a solution of BPA in aqueous sodium hydroxide was prepared.

The solution of BPA in aqueous sodium hydroxide, methylene chloride, and phosgene were continuously passed through a tubular reactor having an inner diameter of 6 mm and a tube length of 30 m at flow rates of 40 L/h, 15 L/h, and 4.0 kg/h, respectively. The tubular reactor had a jacket portion and the temperature of a reaction liquid was kept at 40° C. or less by passing cooling water through the jacket.

The reaction liquid which had exited the tubular reactor was continuously introduced into a baffled vessel-type reactor having an internal volume of 40 L provided with a sweptback blade, and then the solution of BPA in aqueous sodium hydroxide, 25 mass aqueous sodium hydroxide, water, and a 1 mass % aqueous solution of triethylamine were further added to the reactor at flow rates of 2.8 L/h, 0.07 L/h, 17 L/h, and 0.64 L/h, respectively, to thereby perform a reaction. The reaction liquid flowing out of the vessel-type reactor was continuously taken out, and then an aqueous phase was separated and removed by leaving the liquid at rest, followed by the collection of a methylene chloride phase. Thus, a polycarbonate oligomer solution was obtained.

The polycarbonate oligomer solution had a polycarbonate oligomer concentration of 318 g/L.

A chloroformate group concentration in the polycarbonate oligomer was 0.75 mol/L. It should be noted that the chloroformate group concentration was determined from $^1$H-NMR analysis.

The polycarbonate oligomer had a weight-average molecular weight (Mw) of 1,190.

The weight-average molecular weight (Mw) of the polycarbonate oligomer was measured as a molecular weight by using the polystyrene calibration curve according to GPC using tetrahydrofuran as a developing solvent under the following conditions.

Columns: "TOSOH TSK-GEL MULTIPORE HXL-M" manufactured by Tosoh Corporation (2 columns)+"Shodex KF801" manufactured by Showa Denko K.K. (1 column)
Temperature: 40° C.
Flow rate: 1.0 ml/min
Detector: RI Example 7

(1) Production of Polycarbonate-Polyorganosiloxane Copolymer 377 mL of the polycarbonate oligomer solution produced in Production Example 1 described above, 223 mL of methylene chloride, 10.2 g of the 2-allylphenol terminal-modified PDMS having a number of repetitions of the dimethylsiloxy unit of 40 (PDMS-1 produced in Example 1), and 138 μL of triethylamine were loaded into a 1-L tank reactor mounted with a glass reactor having an inner diameter of 10.5 cm and a height of 15.5 cm, 4 baffle boards each having a width of 1.5 cm and a height of 13 cm, and a T-shaped stirring blade having a lateral width of 9 cm and a vertical width of 1.5 cm. 28.26 g of 6.4 mass % aqueous sodium hydroxide was added to the mixture under stirring, and a reaction between the polycarbonate oligomer and the 2-allylphenol terminal-modified PDMS was performed for 10 minutes. A solution of p-t-butylphenol (PTBP) in methylene chloride (prepared by dissolving 3.44 g of PTBP in 24 mL of methylene chloride) and a solution of BPA in aqueous sodium hydroxide (prepared by dissolving 27.75 g of BPA in an aqueous solution prepared by dissolving 14.9 g of NaOH and 55 mg of sodium dithionite in 219 mL of water) were added to the polymerization liquid, and the mixture was subjected to a polymerization reaction for 50 minutes. 95 mL of methylene chloride was added to the resultant for dilution and the diluted product was stirred for 10 minutes.

(2) Polymerization Liquid-Separating Step

The polymerization liquid thus obtained was filled into a cylindrical glass vessel having an inner diameter of 4.2 cm and a height of 40 cm. After a lapse of a predetermined time, an organic phase (methylene chloride solution containing the polycarbonate-polyorganosiloxane copolymer) at a position corresponding to a height of 20 cm from the bottom was collected, and a water content in the organic phase was measured by the method. A relational expression between an elapsed time and the remaining water content in the organic phase was determined by plotting the remaining water content in the organic phase at each elapsed time, and a time (min) required for the water content in the organic phase to reach 2.8 mass % was determined from the relational expression.

After that, the total amount of the organic phase was collected and centrifuged with a centrifuge ("CF6L" manufactured by Hitachi Koki Co., Ltd.) at 3,000 rpm for 5 minutes, followed by the removal of separated water. Thus, an organic phase was obtained.

(3) Aqueous NaOH Washing Step 0.03 mol/L Aqueous NaOH was added to the organic phase obtained in the polymerization liquid-separating step so that the content of the aqueous phase became 15 vol %, and the mixture was stirred at 350 rpm for 10 minutes. The solution obtained after the stirring was filled into a cylindrical glass vessel having an inner diameter of 4.2 cm and a height of 40 cm. After a lapse of a predetermined time, an organic phase (methylene chloride solution containing the polycarbonate-polyorganosiloxane copolymer) at a position corresponding to a height of 20 cm from the bottom was collected, and a water content in the organic phase was measured by the method. A relational expression between an elapsed time and the remaining water content in the organic phase was determined by plotting the remaining water content in the organic phase at each elapsed time, and a time (min) required for the water content in the organic phase to reach 1.5 mass % was determined from the relational expression.

After that, the total amount of the organic phase was collected and centrifuged with a centrifuge ("CF6L" manufactured by Hitachi Koki Co., Ltd.) at 3,000 rpm for 5 minutes, followed by the removal of separated water. Thus, an organic phase was obtained.

(4) Aqueous HCl Washing Step 0.2 mol/L Aqueous HCl was added to the organic phase obtained in the aqueous NaOH washing step so that the content of the aqueous phase became 15 vol %, and the mixture was stirred at 500 rpm for 10 minutes. The solution obtained after the stirring was filled into a cylindrical glass vessel having an inner diameter of 4.2 cm and a height of 40 cm. After a lapse of a predetermined time, an organic phase (methylene chloride solution containing the polycarbonate-polyorganosiloxane copolymer) at a position corresponding to a height of 20 cm from the bottom was collected, and a water content in the organic phase was measured by the method. A relational expression between an elapsed time and the remaining water content in the organic phase was determined by plotting the remaining water content in the organic phase at each elapsed time, and a time (min) required for the water content in the organic phase to reach 1.5 mass % was determined from the relational expression.

After that, the total amount of the organic phase was collected and centrifuged with a centrifuge ("CF6L" manufactured by Hitachi Koki Co., Ltd.) at 3,000 rpm for 5 minutes, followed by the removal of separated water. Thus, an organic phase was obtained.

(5) Pure Water Washing Step

Pure water was added to the organic phase obtained in the aqueous HCl washing step so that the content of the aqueous phase became 15 vol %, and the mixture was stirred at 500 rpm for 10 minutes. The solution obtained after the stirring was filled into a cylindrical glass vessel having an inner diameter of 4.2 cm and a height of 30 cm. After a lapse of a predetermined time, an organic phase (methylene chloride solution containing the polycarbonate-polyorganosiloxane copolymer) at a position corresponding to a height of 20 cm from the bottom was collected, and a water content in the organic phase was measured by the method. A relational expression between an elapsed time and the remaining water content in the organic phase was determined by plotting the remaining water content in the organic phase at each elapsed time, and a time (min) required for the water content in the organic phase to reach 1.5 mass % was determined from the relational expression.

After that, the total amount of the organic phase was collected and centrifuged with a centrifuge ("CF6L" manufactured by Hitachi Koki Co., Ltd.) at 3,000 rpm for 5 minutes, followed by the removal of separated water. Thus, an organic phase was obtained.

Examples 8 to 12, and Comparative Examples 3 and 4

Copolymers were each produced in the same manner as in Example 7 except that in Example 7, any one of the PDMS-2 to the PDMS-8 was used instead of the PDMS-1, washing and oil-water separation were performed, and a time required for a water content in an organic phase to reach a predetermined value in each step was determined. The results are shown in Table 2.

TABLE 2

|  | Example | | | | | | Comparative Example | |
| --- | --- | --- | --- | --- | --- | --- | --- | --- |
|  | 7 | 8 | 9 | 10 | 11 | 12 | 3 | 4 |
| PDMS | PDMS-1 | PDMS-2 | PDMS-3 | PDMS-4 | PDMS-5 | PDMS-6 | PDMS-7 | PDMS-8 |
| Polymerization liquid-separating step (min) (Water content: 2.8 mass %) *1 | 50 | 55 | 55 | 60 | 60 | 70 | 85 | 80 |
| NaOH washing/separating step (min) (Water content: 1.5 mass %) *1 | 67 | 70 | 60 | 75 | 80 | 80 | 110 | 100 |
| Hydrochloric acid washing/separating step (min) (Water content: 1.5 mass %) *1 | 35 | 40 | 65 | 65 | 50 | 75 | 115 | 95 |
| Pure water washing/separating step (min) (Water content: 1.5 mass %) *1 | 50 | 50 | 35 | 60 | 50 | 40 | 50 | 50 |
| Total separation time in all separating steps (min) | 202 | 215 | 215 | 260 | 240 | 265 | 360 | 325 |
| Viscosity-average molecular weight Mv of PC-POS copolymer | 18,000 | 17,700 | 17,300 | 17,300 | 17,500 | 18,100 | 18,100 | 18,100 |

*1: A time (min) required to reach a predetermined water content in an organic phase in each separating step As can be seen from the results of Table 2, when a polycarbonate-polyorganosiloxane copolymer is produced by using the polyorganosiloxane produced by the method of the present invention, an oil-water separation rate in the step of purifying the polycarbonate-polyorganosiloxane copolymer is high.

INDUSTRIAL APPLICABILITY

According to the method of the present invention, a polyorganosiloxane whose transition metal content, especially platinum content is small can be efficiently produced. When the polyorganosiloxane obtained by the present invention is used, an oil-water separation rate in the step of purifying a polycarbonate-polyorganosiloxane copolymer is high, and hence the polycarbonate-polyorganosiloxane copolymer can be efficiently produced.

The invention claimed is:

1. A method of producing a polycarbonate-polyorganosiloxane copolymer, comprising:

(i) dissolving an aromatic polycarbonate oligomer and a polyorganosiloxane in a water-insoluble organic solvent, to obtain a solution, wherein the polyorganosiloxane is produced by a method comprising bringing a polyorganosiloxane produced by using a transition metal-based catalyst into contact with an adsorbent having an average pore diameter of 1,000 Å or less, wherein, after the polyorganosiloxane has been brought into contact with the adsorbent, the polyorganosiloxane has a platinum content of 1 ppm by mass or less, and wherein the polyorganosiloxane is represented by the following general formula (1-1):

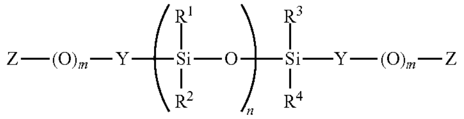

wherein $R^1$ to $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, Y represents a single bond, or an organic residue containing an aliphatic or aromatic moiety, the organic residue being bonded to Si and O or to Si and Z, n represents an average number of repetitions, m represents 0 or 1, Z each independently represent a halogen, $—R^5OH$, $—R^5COOH$, $—R^5NH_2$, $—R^5NHR^6$, —COOH, or —SH, $R^5$ represents a linear, branched, or cyclic alkylene group, an aryl-substituted alkylene group, an aryl-substituted alkylene group which may have an alkoxy group on a ring thereof, or an arylene group, and $R^6$ represents an alkyl group, an alkenyl group, an aryl group, or an aralkyl group;

(ii) adding an aqueous solution of a dihydric phenol-based compound in an alkaline compound to the solution obtained in (i), to obtain a mixture; and (iii) subjecting the mixture obtained in (ii) to an interfacial polycondensation reaction by contacting the mixture with a tertiary amine or a quaternary ammonium salt as a polymerization catalyst in the presence of a terminal stopper, wherein the polycarbonate-polyorganosiloxane copolymer comprises a polyorganosiloxane moiety as a repeating unit having a structure represented by the following general formula (I) and a polycarbonate moiety as a repeating unit having a structure represented by the following general formula (II):

(I)

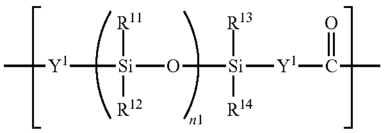

(II)

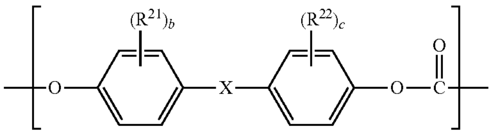

wherein $R^{11}$ to $R^{14}$ each independently represent a hydrogen atom, a halogen atom, an alkyl group having 1 to 6 carbon atoms, an alkoxy group having 1 to 6 carbon atoms, or an aryl group having 6 to 12 carbon atoms, $Y^1$ represents a single bond, or an organic residue containing an aliphatic or aromatic moiety, n1 represents an average number of repetitions, $R^{21}$ and $R^{22}$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, $—SO_2—$, —O—, or —CO—, and b and c each independently represent an integer of 0 to 4.

2. The method according to claim 1, wherein the adsorbent comprises a porous adsorbent.

3. The method according to claim 1, wherein the adsorbent comprises at least one selected from the group consisting of activated clay, acid clay, activated carbon, a synthetic zeolite, a natural zeolite, activated alumina, silica, and a silica-magnesia-based adsorbent.

4. The method according to claim 1, wherein $R^1$ to $R^4$ each independently represent a hydrogen atom, an alkyl group having 1 to 6 carbon atoms, an alkoxy group having 1 to 6 carbon atoms, or an aryl group having 6 to 12 carbon atoms, and Z each independently represent $—R^5OH$, $—R^5COOH$, $—R^5NH_2$, $—R^5NHR^6$, —COOH, or —SH.

5. The method according to claim 1, wherein the polyorganosiloxane is represented by the following general formula (1-2) or (1-4):

(1-2)

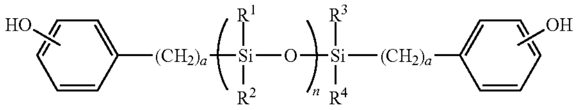

(1-4)

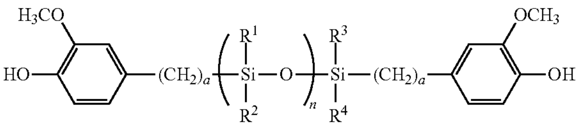

wherein $R^1$ to $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, n represents an average number of repetitions, and a represents a positive integer.

6. The method according to claim 1, wherein $R^1$ to $R^4$ each represent a methyl group.

* * * * *